US005197834A

United States Patent [19]

Chase et al.

[11] Patent Number: 5,197,834

[45] Date of Patent: Mar. 30, 1993

[54] WORK PIECE VICE ENABLING PARALLEL MOVEMENT IN A MILLING MACHINE

[76] Inventors: Russell C. Chase, 6626 Guhn, Houston, Tex. 77040; Donald C. Chase, 11507 Easterling, Houston, Tex. 77065; Robert D. Chase, 6626 Guhn, Houston, Tex. 77040; R. Lee Chase, 16531 Wilderness, Cypress, Tex. 77429

[21] Appl. No.: 793,655

[22] Filed: Nov. 18, 1991

[51] Int. Cl.[5] ............ B23Q 3/06; B25B 1/00

[52] U.S. Cl. ............ 409/131; 269/282; 409/225

[58] Field of Search ............ 409/219, 225, 131; 269/283, 282, 271, 284, 279, 244; 279/123

[56] References Cited

U.S. PATENT DOCUMENTS

| | | | |
|---|---|---|---|
| 4,251,066 | 2/1981 | Bowling | 409/219 |
| 4,462,581 | 7/1984 | Mitani | 269/283 |
| 4,489,929 | 12/1984 | Blechschmidt | 269/282 |
| 4,706,949 | 11/1987 | Dossey et al. | 409/219 |
| 4,798,371 | 1/1989 | Wallisser | 269/283 |
| 4,968,011 | 11/1990 | Womack | 269/244 X |
| 5,015,003 | 5/1991 | Ramunas | 279/123 |

FOREIGN PATENT DOCUMENTS

| | | | |
|---|---|---|---|
| 59161 | 12/1953 | France | 269/282 |
| 1237780 | 6/1960 | France | 269/282 |
| 9000956 | 2/1990 | PCT Int'l Appl. | 269/279 |

*Primary Examiner*—William Briggs
*Attorney, Agent, or Firm*—Gunn & Kuffner

[57] ABSTRACT

A machine tool vise is provided with a set of soft jaws. The soft jaws attach inside and against two master jaws. Both jaws of the vice are equipped with an alignment mechanism to position the soft jaws to assure repositioning. Each jaw is provided with a lenthwise slot which provides a registration face at right angles to an upright registration face at the master jaw. The soft jaw is provided with a bracket that registers on the two faces just mentioned to obtain precise repositioning in two dimensions. Positioning in the third dimension is accomplished by use of a registration pin joining the soft jaw to the master jaw, and a tapered set screw threading into a chamfered opening is used along with the pin to accomplish clamping, thereby assuring complete registration of the bracket holding the soft jaw in the vice. The soft jaws can be mounted, removed and later returned with assurances that the soft jaws are held at a fixed location with respect to the cutter and spindle supporting the cutter. This overcomes errors in and assures parallelism between the cutter and the work piece ultimately supported in the soft jaws.

15 Claims, 2 Drawing Sheets

WORK PIECE VICE ENABLING PARALLEL MOVEMENT IN A MILLING MACHINE

BACKGROUND OF THE DISCLOSURE

A milling machine is used to drill holes, cut or plane surfaces, and to otherwise form a rectangular piece of metal stock into some finished shape. In doing this, the head supports a rotating cutter or spindle which is mounted for movement in three dimensions on an orthogonal mechanism. The movement of the orthogonally referenced spindle or cutter must be repetitively duplicated when making more than one unit of the part being machined. When this occurs, the mill is able to form duplicates of the machined part. There are several impediments which interfere with repetitive motion. The primary difficulties arise from tolerance and hysteresis in the mechanisms controlling the table. Ordinarily, the spindle is mounted above or opposite a table which enables movement to form the cuts necessary for machine operation. Tables however are as true as possible but nevertheless they are subject to error in operation. One of the sources of error derives from the lack of parallel alignment between the table and the support under the table. More specifically, the table is constructed on a guide track which is sometimes referred to as a dove tail groove. The dove tail groove is constructed with a lead screw in it which is hand or motor driven to cause the table to travel along the length of the dove tail. When this occurs, the table top traverses as urged by the lead screw but its movement is not necessarily precisely parallel and equidistant as observed at a work piece which is mounted on the table.

As will be understood, the table is able to move in three directions, thus one dove tail and lead screw moves it in the X direction, another moves it in the Y direction and a third moves it in the Z direction. In all regards, it is necessary that the mechanisms provide tracking in this fashion. More importantly, the work piece which is supported on the table is ordinarily held in a vice so that it is not susceptible to movement when contacted by the cutter supported on the spindle. The cutter and spindle might otherwise cause chatter or dancing movement on the table. This is prevented by mounting the work piece in the vice. As will be understood, the work piece in the jaws of the vice is machined by the cutter and the spindle. As the vice is opened and closed to remove the prior work piece and place a new one in it, and the movements of the table are then repeated, the sequence of events characteristically seeking duplication of the work piece runs the risk of movement which is not precisely orthogonally controlled with respect to the cutter in the spindle. Suffice it to say, in this event the tolerance of movement in the table mounting mechanism pose a problem.

The present apparatus provides a mechanism so that the lack of parallelism is finessed and the work piece is then able to travel in a true or parallel fashion with respect to the orthogonal axis defined by the spindle. This is accomplished by mounting blank soft jaws on the vice. The soft jaws are initially machined to form conforming shoulders and faces which have the necessary parallel positions with respect to the orthogonal axis system at the cutter. The axes are then defined with respect to the cutter in the spindle regardless of the lack of parallelism or tolerances that might otherwise occur in the table support mechanism, presumably in all three directions. The soft jaws are thus machined to receive the blank work piece to assure parallelism initially. The soft jaws are then periodically opened and closed as the work pieces are machined. To assure that replication properly occurs as the multiple work pieces are machined and the finished products are then obtained, it is important that the vice mechanism hold the soft jaws in precisely identified locations repetitively. For instance, the soft jaws in the device may be used to machine 100 units of the work piece. Later, the soft jaws may be stored and subsequently restored to the vice and used again to machine another order of 100 work pieces. In this instance, it is necessary to fasten the soft jaws precisely to the vice in precisely repeated and fixed locations whereby soft jaw positioning is assured to thereby enable the second batch of the work pieces to be machined. To assure proper replication from batch to batch, it is necessary to locate the soft jaws at a precise location above the table, and to this end the present disclosure sets forth a vice and jaw mounting mechanism which assures that the soft jaws are placed in exactly the same place time and again. This arises from and relates to the mounting mechanism set forth in this disclosure for mounting the jaws. The jaws are preferably constructed with a pair of spaced circular openings on a mounting bracket. The vice has two registered, fixed mounting surfaces, and in particular utilizes a pair of parallel pins to accomplish registration with clamping so that the soft jaws are restored to precisely the same location with regard to an orthogonal reference in the device.

The present disclosure thus sets forth a bench vice which has a base and left and right fixed jaws. A vice opening mechanism is ordinarily included, and the vice includes a base plate which has a surrounding flange enabling connection to slots on the work table of the milling machine. The fixed or master jaws support registration pins. Conveniently, one of the pins is a simple dowel, and one at the opposite end is accomplished by means of a pointed set screw. The set screw has a tapered point at one end. The set screw point engages a protruding mounting bracket on a soft jaw, and registers in an enlarged conic cavity, and when threaded into the vice, forces the soft jaw with clamping action to thereby register the soft jaw repetitively at the same location with great accuracy. This assists in positioning the soft jaw at a fixed location. Given the fact that the soft jaw is machined with faces and shoulders conforming to the work piece, the machinist is therefore able to set up the equipment for repetitive operation time and again, and thereby remount the soft jaws in precisely the correct location.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
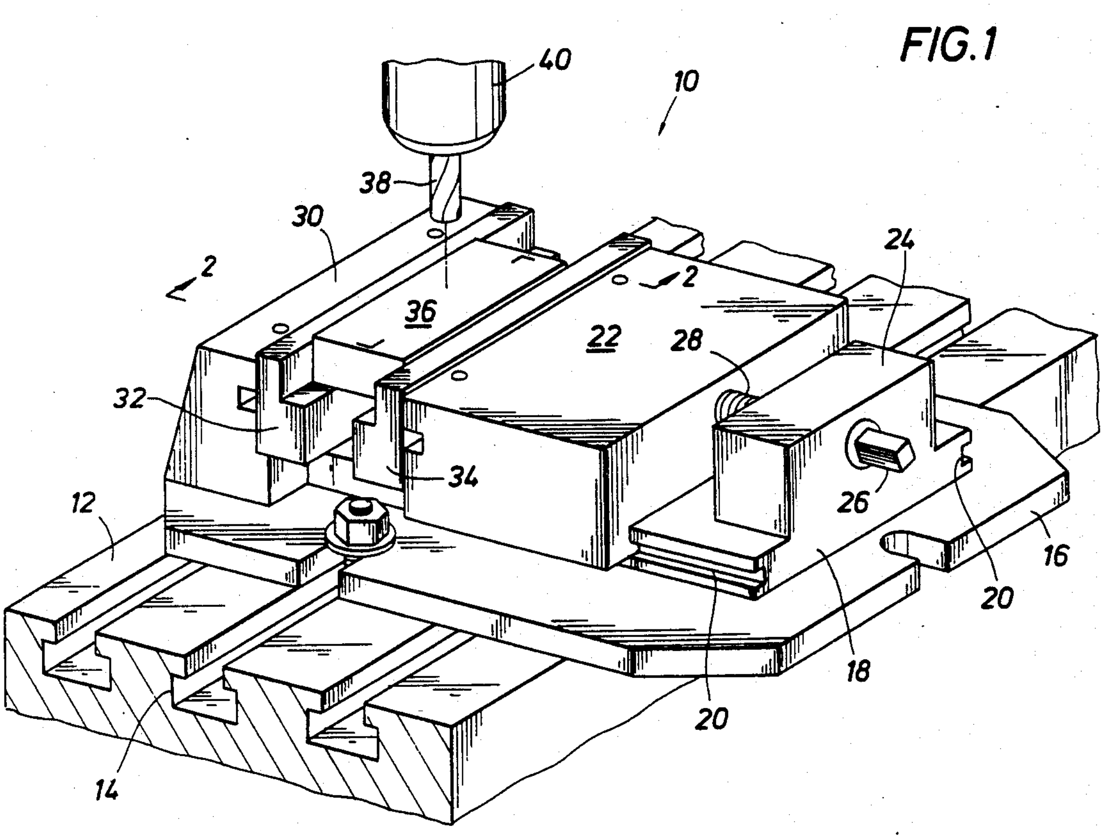
FIG. 1 is an isometric view of the vice at the present invention with a pair of soft jaws holding a work piece repetitively positioned with respect to a coordinate system relating to the cutter and spindle.

Attention is first directed to FIG. 1 of the drawings where the numeral 10 identifies a machine tool vice constructed in accordance with the present disclosure. The vice is positioned on and clamped above a table 12 of the machine tool. The table is able to move in three directions and is moved in accordance with an XYZ coordinate system. The table is supported on three traveling mechanisms enabling movement in the three mutually orthogonal directions. One aspect of the table involves the incorporation of the slots 14 which are located so that the vice can be fastened on the table. Typically, this is accomplished to set up the equipment prior to machining. The structure includes the three orthogonal travel mechanisms, namely, a dove tail slot with a lead screw and travelling nut positioned in it as is customary in devices of this sort. FIG. 1 marks a three dimensional reference thereby defining movement in the XYZ system.

The vice 10 includes a bottom flange plate 16 which is constructed with appropriate notches and slots formed in it to enable the plate 16 to be clamped to the table 12. This is accomplished as shown in FIG. 1 through the use of one or more clamping bolts equipped with washers and nuts. Typically, the head of the bolt is located in the under cut slot with the threaded end exposed, and the nut is engaged to complete locking down of the vice. The flange plate 16 is the base of the vice mechanism. It supports a grooved plate 18 which incorporates left and right ways at 20. These are included to enable one jaw 22 of the vice to traverse the length of the vice as the vice is opened or closed. Movement of the jaw 20 is relative to the plate 18 guided by the ways 20. An upstanding pillow block 24 is likewise included and has an aligned passage in it to receive and support a head 26 attached to a lead screw 28 to enable the jaw 22 to traverse the plate 16. The jaw 22 moves toward or away from the opposing jaw 30. The jaw 30 is preferably fixed so that the two jaws open and close by movement of the opposite jaw 22. The master jaws 22 and 30 are permanent jaws and are constructed in accordance with the teachings of the present disclosure to support the sacrificial soft jaws which are positioned between them. In this instance, the soft jaws are identified by the numerals 32 and 34.

The jaws 32 and 34 are machined blanks which are cut with suitable steps and faces as exemplified to support a work piece 36. The work piece can be any size or shape that will fit. The work piece is the item to be machined by the overhead cutter 38 supported on the moveable spindle 40 which is indexed to specific locations to carry out the machining process. Moreover, the soft jaws 32 and 34 come in a blank form, typically having simple rectangular faces. They are installed in the jaws and then machined to form the steps and faces necessary to hold the work piece 36 dependent on the shape or profile of the work piece. Accordingly, the soft jaws 32 and 34 are tailored to a particular work piece shape. An example is shown in FIG. 1 where the work piece is a rectangular member having six faces at right angles, and the facing soft jaws 32 and 34 are constructed to hold the work piece. As a preliminary to installation of the work piece on the soft jaws, the cutter 38 driven by the spindle 40 is used to machine a portion of the soft jaws to form a shoulder in registration with the work piece, and the work piece is then installed on the facing shoulders. As will be understood, the preliminary step of preparing the soft jaws involves machining the steps on them so that they conform with the work piece 36. Certain advantages of this will be described in detail later.

One of the features of the present invention is the method of mounting the soft jaws in place. This is partly shown in FIG. 2 of the drawings. There, the fixed jaw 30 is shown at the left side of the view supporting the jaw 32. The jaw 32 is held in location and registers at a particular point. It is constructed with a mounting tab 44 on the backside. The mounting tab extends into an alignment slot 46. There is extra width in the slot 46 so that it is larger than the thickness of the tab 44. The tab 44 is forced downwardly to register on the face 48 which is the bottom face of the wider slot 46. The protruding tab is driven downwardly against the face 48 by a mechanism which will be described.

The jaw 30 includes an abutting face 50 which supports and registers the soft jaw 32. The soft jaw is pulled against it in a fashion to be described. The two faces 48 and 50 serve as registration surfaces which thereby assure that the soft jaw is fixed at the same location at each installation. Moreover, the soft jaw 32 conforms with these two faces at each installation.

The foregoing arrangement is duplicated in a symmetrical fashion with the moveable jaw 22. Since this same mechanism is incorporated, and since it functions in the same fashion, a specific description of that jaw mounting arrangement will not be given. Rather, a description of the first jaw mounting mechanism is readily extended for the second.

As mentioned, the soft jaw is registered against the faces 48 and 50. This describes an infinite number of positions for the jaw. Registration along the length of the faces 48 and 50 is accomplished by the mechanism which is best understood on reference to FIG. 3 of the drawings. There, the numeral 60 identifies a pin which is vertically inserted through the jaw in an opening aligned with and intercepting the slot 46. The pin 60 is smaller in diameter than the circular hole 62 as will be described. As noted in comparing FIG. 2 of the drawings, the pin 60 can fit snugly in the drilled hole in the vice jaw 30. The larger hole 62 is in the soft jaw mounting tab or bracket 44. This uses a simple circular hole or part of a circle at the end of the tab.

Figure 2:
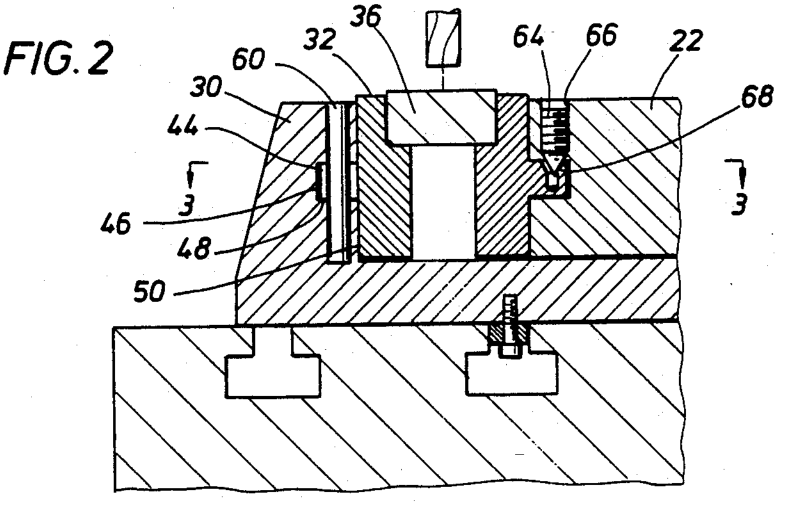
FIG. 2 is a sectional view along the line 2—2 of FIG. 1 showing the mounting pins on the soft jaws, and additionally showing the construction of the mounting pins to assure clamping.
Figure 3:
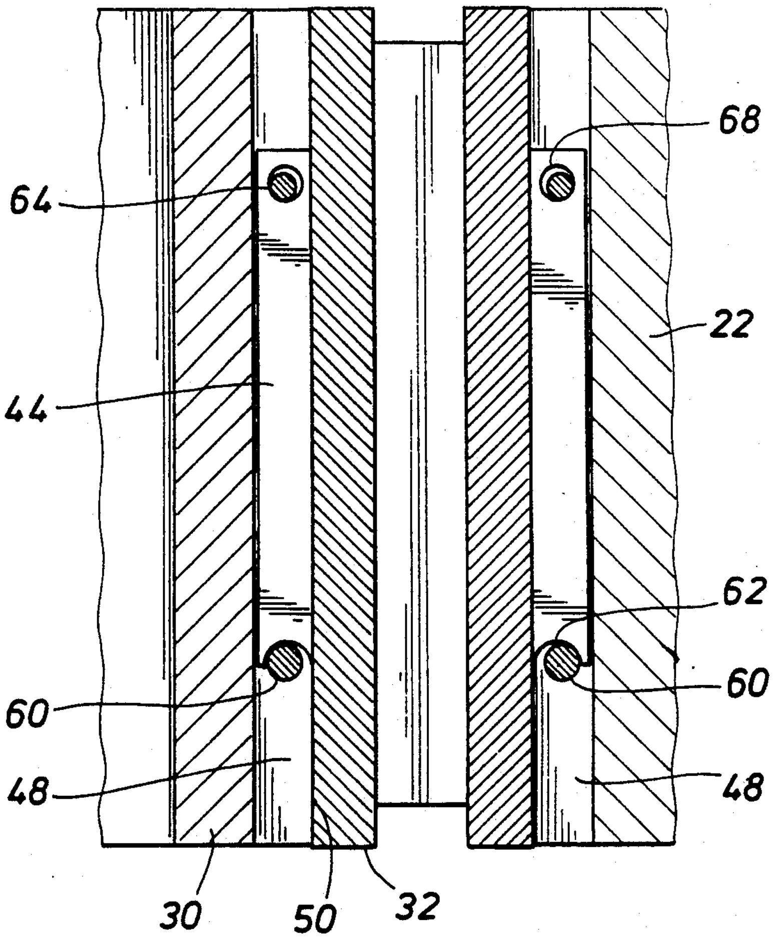
FIG. 3 is a sectional view along the line 3—3 of FIG. 2 showing details of construction of the soft jaws and mounting tabs so that clamping of the soft jaws is achieved.
Figure 4:
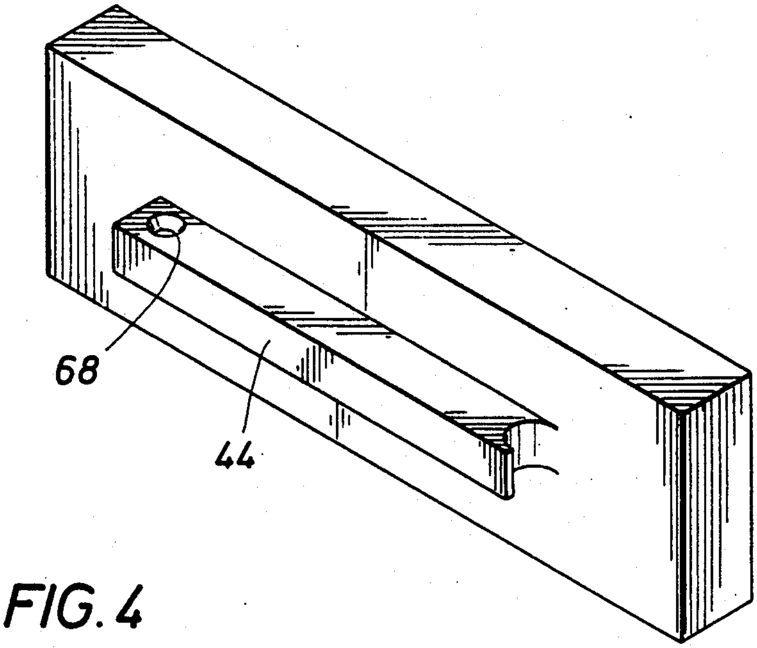
FIG. 4 is an isometric view of the mounting bracket on the backside of a soft jaw to assure repetitive mounting.

The opposite end of the bracket 44 is caught by a similar construction. This construction however is different in that it utilizes a tapped opening receiving a set screw 64 which is threaded into the tapped opening 66. The opening 66 is drilled with a fixed diameter and tapers at its bottom. Moreover, the set screw tapers to a point. The point of the set screw is tapered so that it will fit into a tapered hole 68 in the mounting bracket 44, the taper having the form of a chamfer around a circular hole which enables the point of the taper to extend into the hole as illustrated in FIG. 2 of the drawings. The chamfered hole 68 is constructed with this construction thereby assuring that the threaded engagement of the set screw forces the point into an aligned hole and chamfered lip.

The interaction of the pin at one end and the threaded and tapered set screw at the opposite end clamps the bracket into registration. Explaining, it will be observed that in all instances the two round members bear against the bracket at a line of contact which urges the bracket into engagement with the faces 48 and 50. As viewed in FIG. 2 of the drawings, the soft jaw 32 is forced downwardly against the face 48 and is forced to the side against the face 50. Lengthwise registration is accomplished by jamming against the pin 60. The pin 60 thus provides registration in the third dimension because it is at right angles to the other two surfaces. The bracket is free to slide on the faces 48 and 50 and will slide into contact jammed against the upstanding pin.

The pin and cooperative set screw thus function as a clamp which pulls the bracket and the soft jaw attached to it into the registered condition. In the registered state, the soft jaw is then held in a fixed location. It is easily installed or removed by use of the set screw. The set screw engages the chamfer 68 to force the bracket into the clamping motion, assuring repeated registration. Therefore by use of the tapered tip on the set screw in conjuction with the chamfered opening which it engages, the soft jaw is registered with respect to the master jaw. As will be readily observed, the same arrangement is used for both soft jaws and the two soft jaws are jointly installed in a quick fashion so that easy reinstallation is accomplished time and again.

Consider now the impact of this construction in light of the difficulties encountered. Recall that there is no assurance that there will not be dimensional and angular tolerances involved in the traverse mechanism which supports the table 12. This may create error in all three dimensions. That is, it may create error which has the form of a lack of parallelism so that nothing moves when supported on the table in a defined orthogonal system with respect to the cutter 38 and the spindle 40. A blank set of soft jaws is placed in the vice and the vice is fastened on the table which is then moved to machine the necessary steps and faces on the blank soft jaws to enable the machining of the work piece 36 thereafter. The soft jaws, assumed to be perfectly rectangular with right angles at all corners, may well be machined with steps and faces which are not at right angles to the respective faces. However, any error that occurs in the position of the table with respect to the cutter 38 can be readily countered by machining the soft jaws so that the work piece travels in the desired direction and parallel fashion necessary for repetitive machining. In other words, any error which may arise from a result of tolerances or a lack of parallelism in the table and its support mechanism can be cancelled by intentionally machining the soft jaws so that they define a parallel area. When the work piece is registered against the soft jaws, the work piece is moved in parallel fashion to all the axes of movement for the spindle 38 and relatively parallel tracking necessary for operation is then accomplished.

The present apparatus functions in a repetitive fashion. Assume for instance that the table is not parallel along the axis defined by the slots 14 shown in FIG. 1 of the drawings. If the vice is clamped on the table and is then removed and later repositioned on the table in the slots, it will be exposed to the same error. Generally speaking, this error is not large, and is usually only a few minutes of a degree. Whatever the case, the vice can be reinstalled by connection in the slots, and the soft jaws are then repositioned in the vice. The vice will then experience the same angular error with respect to the axis system for the cutter 38. This will be true even though the vice is not precisely at the same location on the table because the table maintains a constant error unless the surface 12 of the table is warped or otherwise curved. Therefore when the vice and the supported soft jaws combination is installed to support the work piece 36, the error that was encountered with respect to and in regard to the slots 14 in the table will again by accommodated by this system. If, for instance, the table had a tilt of five minutes along the slots 14, this can be cancelled by an equal and opposite tilt during the step of cutting the faces and shoulders on the soft jaws so that the top face of the work piece moves in a true parallel fashion with respect to the coordinate system defined by the cutter. Even removal and reinstallation does not interfere with this so long as the same soft jaws are installed utilizing the benefits and features of the present invention.

Once machining is finished, the soft jaws can be discarded. However, it is more practical to store them so that they can be used time and again by remounting on the master jaws as shown in FIG. 1 of the drawings.

While the foregoing is directed to the preferred embodiment, the scope is determined by the claims which follow.

We claim:

1. A method of registering blank work pieces on a table relative to a cutter wherein the cutter defines a reference orthogonal axis system and the method comprises the steps of:

(a) placing blank soft jaws in a vice having master jaws and attaching the vice on a table movable relative to the cutter and the defined reference orthogonal axis system;

(b) machining the soft jaws to form blank work piece supporting shoulders to support and hold at the same location work pieces repetitively registered to enable duplicate work piece conversion into a machined part;

(c) during the step of placing the blank soft jaws. positioning the soft jaws at a specific location relative to the vice master jaws, this step including the steps of:

(1) placing both of the soft jaws at fixed locations on the master jaws;

(2) registering the soft jaws on the master jaws with respect to a reference system; and (3) clamping the soft jaws to prevent movement by positioning a registration pin to hold a soft jaw against movement in a certain direction, and also positioning a second registration pin to also hold the soft jaw against movement in a direction opposite to the certain direction.

2. A clamping mechanism for holding a work piece on a word table opposite a cutter wherein the cutter defines a first orthogonal reference system in three dimensions, wherein the apparatus comprises:

(a) a demountable machine table vice having facing moveable master jaws;

(b) a pair of soft jaws attached to the master jaws to support a work piece; and (c) registration means releasably clamping the soft jaws with respect to the master jaw in repetitive fashion to assure that the soft jaws, after removal and reinstallation, are returned to a registered position with respect to the master jaws and said registration means comprising:

(1) a fixed face on said master jaws defining one of said registration means;

(2) a second fixed face at an angle to said first face to define a second of said registration means;

(3) a registration pin and cooperative pin receiving surface located to define a third registration means; and (4) wherein said third registration means includes a spaced and separated cooperative means defining clamp means preventing soft jaw movement after installation.

3. The apparatus of claim 2 wherein said first and second faces are at right angles.

4. The apparatus of claim 2 wherein said third registration means comprises means limiting movement of said soft jaws relative to said first and second faces.

5. The apparatus of claim 2 wherein said third registration means comprises said clamping means and includes removable pin fasteners for said soft jaws.

6. The apparatus of claim 5 wherein said soft jaws include a protruding lockable tab extending into contact with said first and second fixed faces;

and further wherein said clamp means secures said tab against said first and second fixed faces.

7. The apparatus of claim 6 wherein said tab is received in a lengthwise slot in said master jaws and one of said first and second faces is in said slot.

8. The apparatus of claim 7 wherein said tab and slot permit sliding movement along said slot, and said third registration means limits such movement.

9. A method of registering blank work pieces on a table relative to a cutter wherein the cutter defines a reference orthorgonal axis system and the method comprises the steps of:

(a) placing blank soft jaws in a vice having master jaws and attaching the vice on a table movable relative to me cutter and the defined reference orthogonal axis system;

(b) machining the soft jaws to form blank work piece supporting shoulders to support and hold at the same location work piece repetitively registered to enable duplicate work piece conversion into a machined parts;

(c) during the step of placing the blank soft jaws, positioning the soft jaws at a specific location relative to the vice master jaws, this step including the steps of:

(1) placing both of the jaws at fixed locations on the master jaws;

(2) registering the soft jaws on the master jaws with respect to a reference system; and (3) clamping the soft jaws to prevent movement from the registered position relative by advancing a tapered point in forcing a soft jaw into a registered position.

10. The method of claim 9 wherein the step of clamping the soft jaws includes the steps of:

(a) positioning a registration pin to hold a soft jaw against movement in a certain direction; and (b) positioning a second registration pin to also hold the soft jaw against movement in a direction opposite to the certain direction.

11. The method of claim 1 wherein the step of clamping includes advancing a tapered point in forcing a soft jaw into a registered position.

12. The method of claim 11 wherein the tapered point is on a set screw and engages a co-acting chamfered surface to force soft jaw registration.

13. The method of claim 11 wherein the tapered point cooperatively pushes the soft jaw against a cooperative surface.

14. The method of claim 9 wherein the tapered point is on a set screw and engages a co-acting chamfered surface to force soft jaw registration.

15. The method of claim 9 wherein the tapered point cooperatively pushes the soft jaw against a cooperative surface.

* * * * *